(12) United States Patent
Ueda et al.

(10) Patent No.: US 11,474,239 B2
(45) Date of Patent: Oct. 18, 2022

(54) ULTRASONIC WAVE SENSOR

(71) Applicant: DENSO CORPORATION, Kariya (JP)

(72) Inventors: Keisuke Ueda, Kariya (JP); Takeo Tsuzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 423 days.

(21) Appl. No.: 16/562,147

(22) Filed: Sep. 5, 2019

(65) Prior Publication Data

US 2019/0391263 A1 Dec. 26, 2019

Related U.S. Application Data

(63) Continuation of application No. PCT/JP2018/008655, filed on Mar. 6, 2018.

(30) Foreign Application Priority Data

Mar. 7, 2017 (JP) .............................. JP2017-043175
Dec. 5, 2017 (JP) .............................. JP2017-233538

(51) Int. Cl.
*G01S 7/521* (2006.01)
*G01S 15/931* (2020.01)

(52) U.S. Cl.
CPC ............ *G01S 15/931* (2013.01); *G01S 7/521* (2013.01); *G01S 2015/938* (2013.01)

(58) Field of Classification Search
CPC ...... G10K 9/22; G10K 11/002; G01S 15/931; G01S 7/521; G01S 2015/938
USPC ......................................................... 73/632
See application file for complete search history.

(56) References Cited

U.S. PATENT DOCUMENTS

| 5,629,690 | A | * | 5/1997 | Knoll | G01S 7/521 340/904 |
| 7,398,687 | B2 | * | 7/2008 | Nakajima | G10K 11/004 73/632 |
| 7,428,187 | B2 | * | 9/2008 | Nakajima | G01S 7/521 367/188 |
| 7,522,474 | B2 | * | 4/2009 | Nakajima | G01S 7/521 367/188 |

(Continued)

FOREIGN PATENT DOCUMENTS

| DE | 102015216200 A1 * | 3/2017 | ............ G10K 13/00 |
| EP | 3196671 A2 * | 7/2017 | |

(Continued)

*Primary Examiner* — Jacques M Saint Surin
(74) *Attorney, Agent, or Firm* — Maschoff Brennan

(57) ABSTRACT

An ultrasonic wave sensor includes: a bezel configured by a tubular member having a hollow portion, and including a tubular portion and a flange, the flange having a larger radial dimension than the tubular portion, one surface of the flange on a side opposite to the tubular portion being a front surface, one surface of the flange on the tubular portion side being a back surface; a sensor body including an ultrasonic vibrator and integrated with the bezel while part of the sensor body is inserted into the hollow portion; and a vibration prevention member arranged on the back surface and configured by an elastic body to prevent vibration transmission. The vibration prevention member is an O-ring having an annular shape surrounding the bezel so as to surround a center axis of the bezel, and the back surface has a ring-shaped groove into which part of the O-ring is inserted.

5 Claims, 16 Drawing Sheets

(56) References Cited

U.S. PATENT DOCUMENTS

| | | | |
|---|---|---|---|
| 7,583,563 B2* | 9/2009 | Nakajima | G10K 9/122 367/188 |
| 7,726,192 B2* | 6/2010 | Okuda | G01S 7/521 73/649 |
| 8,794,071 B2* | 8/2014 | Inoue | B60R 19/483 73/649 |
| 2003/0121331 A1 | 7/2003 | Mitsuoka et al. | |
| 2007/0230274 A1 | 10/2007 | Nakajima et al. | |
| 2010/0039766 A1 | 2/2010 | Chiang et al. | |
| 2014/0355382 A1 | 12/2014 | Tsuji et al. | |

FOREIGN PATENT DOCUMENTS

| | | | |
|---|---|---|---|
| JP | S55-159500 A | | 12/1980 |
| JP | S61-008440 B | | 12/1980 |
| JP | 59-020230 B | | 5/1984 |
| JP | 4-271246 A | | 9/1992 |
| JP | 2003-255043 A | | 9/2003 |
| JP | 2005-203831 A | | 7/2005 |
| JP | 2006-076383 A | | 3/2006 |
| JP | 2007-177973 A | | 7/2007 |
| JP | 2007-251534 A | | 9/2007 |
| JP | 2009228714 | * | 10/2009 |
| JP | 5239692 B2 | * | 7/2013 |
| WO | 2012/032584 A1 | | 3/2012 |

* cited by examiner

ULTRASONIC WAVE SENSOR

CROSS-REFERENCE TO RELATED APPLICATION

The present application is based on and claims the benefit of priority from earlier Japanese Patent Application No. 2017-43175 filed on Mar. 7, 2017 and Japanese Patent Application No. 2017-233538 filed on Dec. 5, 2017, the descriptions of which are incorporated herein by reference.

BACKGROUND

Technical Field

The present disclosure relates to an ultrasonic wave sensor that outputs ultrasonic waves to detect a distance to an object.

Related Art

An ultrasonic wave sensor has conventionally been used to detect an obstacle that is present in the vicinity of a vehicle. The ultrasonic wave sensor is typically attached to a bumper or the like of the vehicle.

SUMMARY

As an aspect of the present disclosure, an ultrasonic wave sensor is provided which includes: a bezel that is configured by a tubular member having a hollow portion whose center axis extends in one direction, and includes a tubular portion and a flange at one end of the tubular portion, the flange having a larger radial dimension with respect to the center axis than the tubular portion, one surface of the flange on a side opposite to the tubular portion being a front surface, one surface of the flange on the tubular portion side being a back surface; a sensor body that includes an ultrasonic vibrator and is integrated with the bezel in a state where a part of the sensor body including the ultrasonic vibrator is inserted into the hollow portion of the bezel; and a vibration prevention member that is arranged on the back surface of the flange and is configured by an elastic body to prevent transmission of vibration of the ultrasonic vibrator. The vibration prevention member is an O-ring having an annular shape surrounding the bezel so as to surround the center axis of the bezel, and the back surface of the flange has a ring-shaped groove into which at least a part of the O-ring is inserted.

DETAILED DESCRIPTION OF THE PREFERRED EMBODIMENTS

Figure 1A:
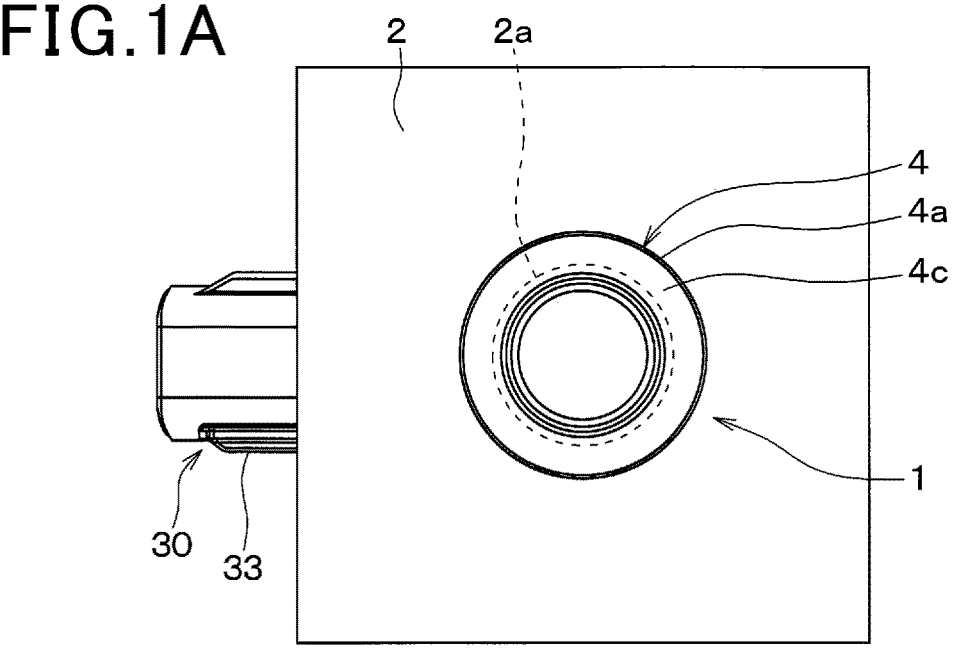
FIG. 1A is a front view of an ultrasonic wave sensor according to a first embodiment attached to a bumper.
Figure 1B:
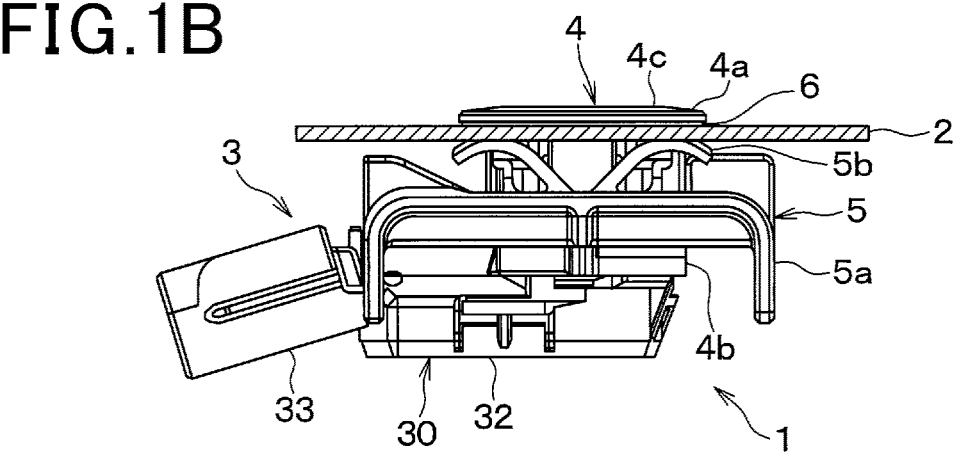
FIG. 1B shows the ultrasonic wave sensor in FIG. 1A viewed from below.
Figure 1C:
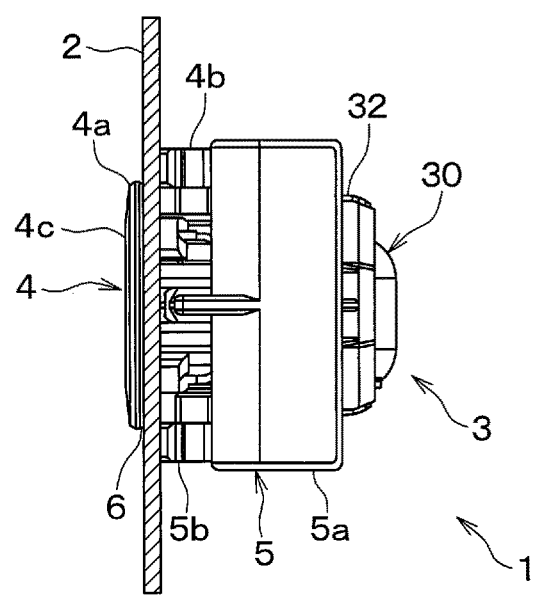
FIG. 1C shows the ultrasonic wave sensor in FIG. 1A viewed from a right side.
Figure 1D:
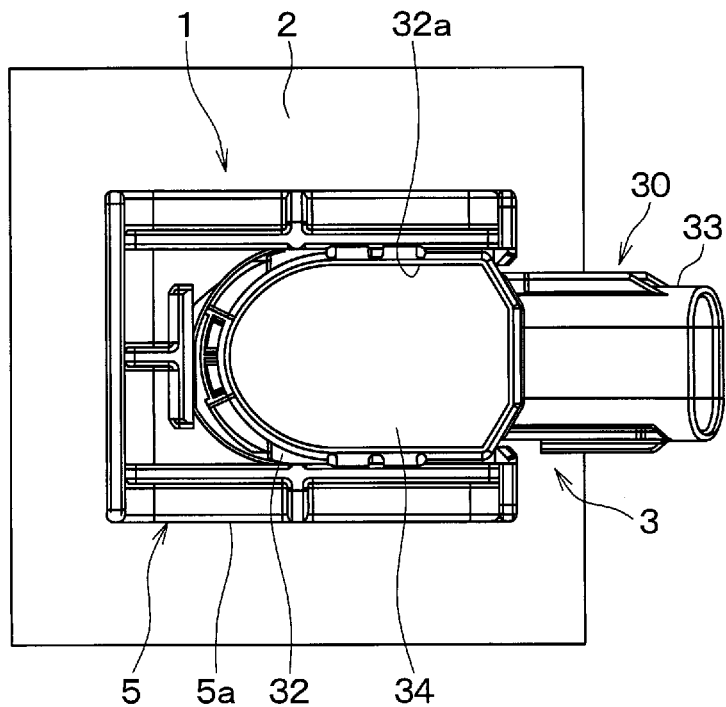
FIG. 1D shows the ultrasonic wave sensor in FIG. 1A viewed from a back surface side.
Figure 1E:
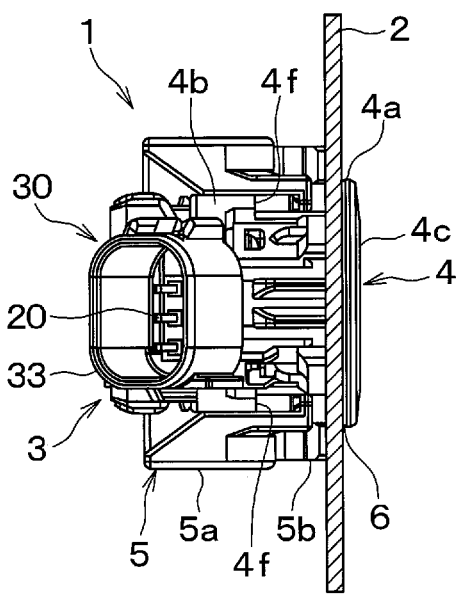
FIG. 1E shows the ultrasonic wave sensor in FIG. 1A viewed from a left side.

An ultrasonic wave sensor has conventionally been used to detect an obstacle that is present in the vicinity of a vehicle. The ultrasonic wave sensor is typically attached to a bumper or the like of the vehicle. For example, as in JP 2007-251534 A, an ultrasonic wave sensor is fixed to a bumper by attaching, together with an annular bezel, a sensor body including an ultrasonic vibrator in a hole formed in the bumper.

The ultrasonic wave sensor detects an obstacle that is present in the vicinity of the bumper by causing the ultrasonic vibrator to output ultrasonic waves and receiving reflected waves of the ultrasonic waves. Specifically, when the ultrasonic wave sensor causes the ultrasonic vibrator to generate ultrasonic waves and receives reflected waves after reverberation, the ultrasonic wave sensor detects a distance to the obstacle on the basis of a time between an output timing of the ultrasonic waves and a reception timing of the reflected waves. For example, the ultrasonic wave sensor includes a piezoelectric element composed of piezoelectric ceramic or the like. The ultrasonic wave sensor outputs ultrasonic waves by applying a voltage to the piezoelectric element, and detects reflected waves by using, as a detection output, electromotive force generated by the piezoelectric element due to vibration caused when the reflected waves are received. The detection output of the piezoelectric element generated when the reflected waves are received is small, and thus the detection of the reflected waves is performed by amplifying the detection output and comparing an output waveform obtained after the amplification with a threshold voltage.

A resin material is typically used for bumpers of vehicles. Due to design properties or the like, however, metal is used in some cases. When an ultrasonic wave sensor is attached to a bumper composed of a material, such as metal, to which vibration is easily transmitted, vibration itself is amplified and reverberation continues for a long time. This causes a problem that reverberation is present until a timing assumed to be a reception timing of reflected waves and the ultrasonic wave sensor erroneously detects that reflected waves are received.

An object of the present disclosure is to provide an ultrasonic wave sensor capable of preventing erroneous detection even when the ultrasonic wave sensor is attached to a member composed of a material, such as metal, to which vibration is easily transmitted.

Embodiments of the present disclosure will be described below with reference to the drawings. In the following embodiments, the same or equivalent portions are given the same reference numerals in the description.

First Embodiment

An ultrasonic wave sensor according to a first embodiment will be described. For example, the ultrasonic wave sensor of the present embodiment is attached to a bumper of a vehicle and is used as a back sonar or a corner sonar.

FIGS. 1A to 1E show an ultrasonic wave sensor 1 of the present embodiment attached to a bumper 2. FIGS. 1A to 1E show only a part of the bumper 2. The bumper 2 is composed of a material, such as metal, to which vibration is easily transmitted.

As shown in FIG. 1A, the ultrasonic wave sensor 1 is fixed to the bumper 2 by being fitted into a hole 2a formed in the bumper 2.

Specifically, as shown in FIGS. 1A to 1E, FIGS. 2A to 2E, FIGS. 3A to 3E, FIGS. 4A to 4E, FIGS. 5A and 5B, FIGS. 6A to 6E, and FIGS. 7A and 7B, the ultrasonic wave sensor 1 of the present embodiment includes a sensor body 3, a bezel 4, a retainer 5, and a vibration prevention member 6.

The ultrasonic wave sensor 1 is fixed to the bumper 2 by inserting the sensor body 3 integrated with the bezel 4 and the vibration prevention member 6 shown in FIGS. 6A to 6E from the outside of the bumper 2 into the hole 2a of the bumper 2 and then attaching the retainer 5 to a back side of the bumper 2.

Detailed structures of the sensor body 3, the bezel 4, the retainer 5, and the vibration prevention member 6 will be described below.

As shown in FIGS. 2A to 2E, the sensor body 3 is configured such that an ultrasonic vibrator 10, a terminal 20, and the like are integrally housed in a case 30.

Figure 5A:
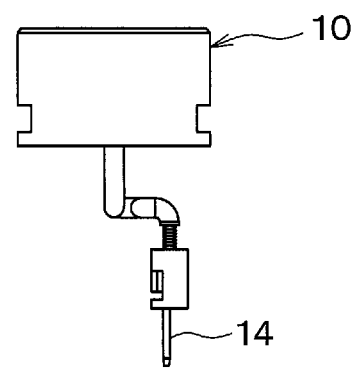
FIG. 5A is a side view of an ultrasonic vibrator included in the sensor body.
Figure 5B:
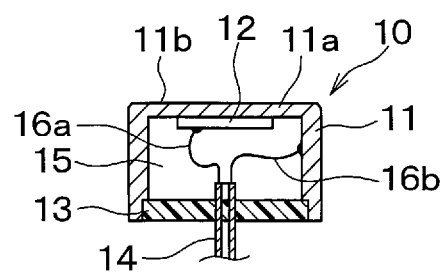
FIG. 5B is a cross-sectional view of the ultrasonic vibrator in FIG. 5A.
Figure 6A:
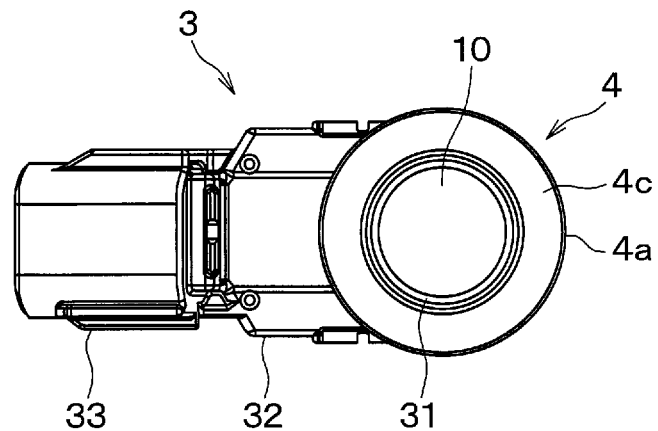
FIG. 6A is a front view of the sensor body integrated with the bezel.
Figure 6B:
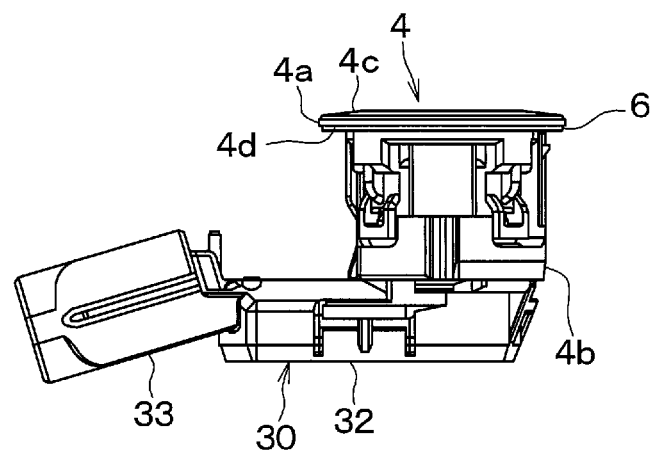
FIG. 6B shows the sensor body in FIG. 6A viewed from below.
Figure 6C:
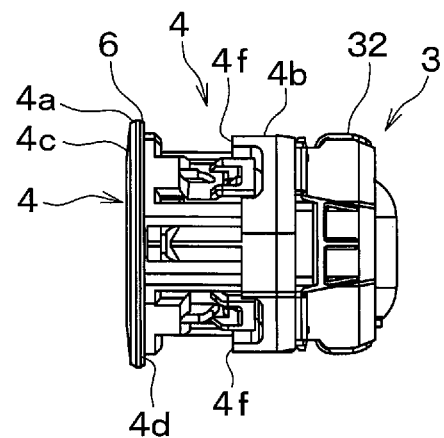
FIG. 6C shows the sensor body in FIG. 6A viewed from a right side.
Figure 6D:
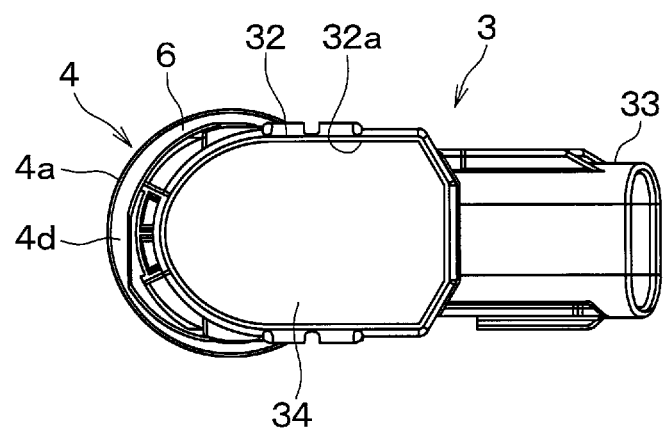
FIG. 6D shows the sensor body in FIG. 6A viewed from a back surface side.
Figure 6E:
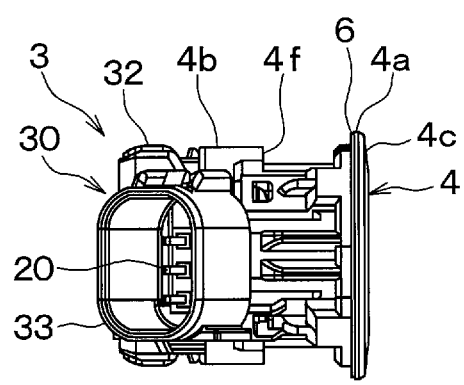
FIG. 6E shows the sensor body in FIG. 6A viewed from a left side.

As shown in FIGS. 5A and 5B, the ultrasonic vibrator 10 includes a housing 11, a piezoelectric element 12, a base 13, a lead wire 14, and the like.

The housing 11 is composed of a conductive material, for example, a metal material or an insulating material in which a conductive film is formed on a surface. The housing 11 has a bottomed cylindrical shape so that an internal space 15 is formed inside the housing 11. The piezoelectric element 12 is bonded to an inner surface of a bottom portion 11a of the housing 11, and an outer surface of the bottom portion 11a is a vibration surface 11b.

The piezoelectric element 12 is composed of, for example, piezoelectric ceramic, and although not shown, the piezoelectric element 12 includes electrodes on its both front and back surfaces. One of the electrodes of the piezoelectric element 12 is electrically connected to one of a pair of lead wires 14 with a lead 16a. The other electrode of the piezoelectric element 12 is bonded to the bottom portion 11a of the housing 11, for example, with an adhesive, is connected to a lead 16b via the housing 11 composed of a conductive material, and is then electrically connected to the other of the pair of lead wires 14. The other electrode of the piezoelectric element 12 and the inner surface of the housing 11 have protrusions and recesses caused by surface roughness. Accordingly, even when the other electrode of the piezoelectric element 12 is bonded to the housing 11 with the adhesive, the protrusions are in contact with each other, and thus the other electrode of the piezoelectric element 12 is electrically connected to the housing 11. Furthermore, the adhesive may be a conductive adhesive.

The base 13 is fixed to the housing 11 by being fitted into an opening of the housing 11. The base 13 is composed of an insulating material such as resin.

The lead wires 14 are composed of, for example, a conductive material whose main component is copper, and the lead wires 14 are electrically connected to the piezoelectric element 12 by being connected to the leads 16a and 16b.

While the piezoelectric element 12, the leads 16a and 16b, and the like are housed in the housing 11, the base 13 is fitted into the opening of the housing 11, so that the ultrasonic vibrator 10 has an integrated structure. The ultrasonic wave sensor 1 is constituted by assembling, together with the terminal 20 and the like, the ultrasonic vibrator 10 having such a configuration into the case 30 that is hollow and is composed of a synthetic resin. Although not shown, the inside of the housing 11 may be filled with a foaming agent, silicone rubber, or the like for vibration prevention. In the present embodiment, the ultrasonic vibrator 10 has the integrated structure in which the base 13 is fitted into the opening of the housing 11, but the ultrasonic vibrator 10 may have a structure without the base 13.

The terminal 20 constitutes an external connection terminal for electrically connecting the ultrasonic wave sensor 1 to the outside. A first end of the terminal 20 is exposed from the case 30, and a second end of the terminal 20 is fitted into the case 30. The second end of the terminal 20 is electrically connected to a circuit board (not shown) provided in the case 30.

Figure 2A:
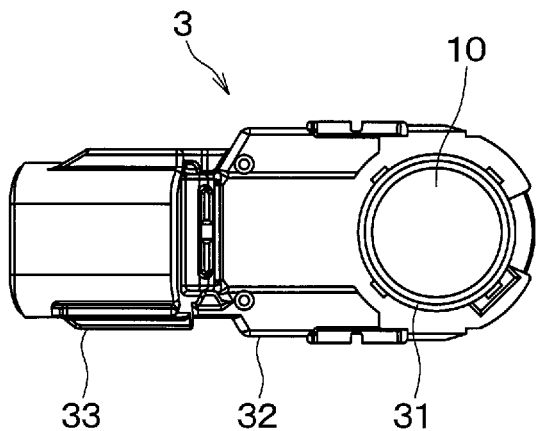
FIG. 2A is a front view of a sensor body.
Figure 2B:
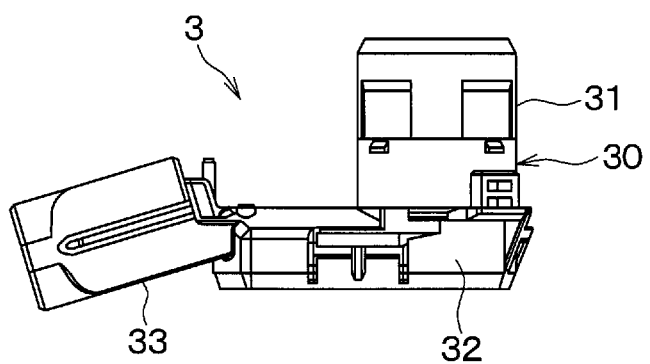
FIG. 2B shows the sensor body in FIG. 2A viewed from below.
Figure 2C:
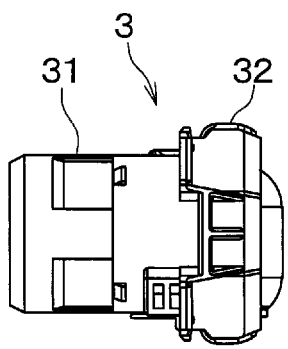
FIG. 2C shows the sensor body in FIG. 2A viewed from a right side.
Figure 2D:
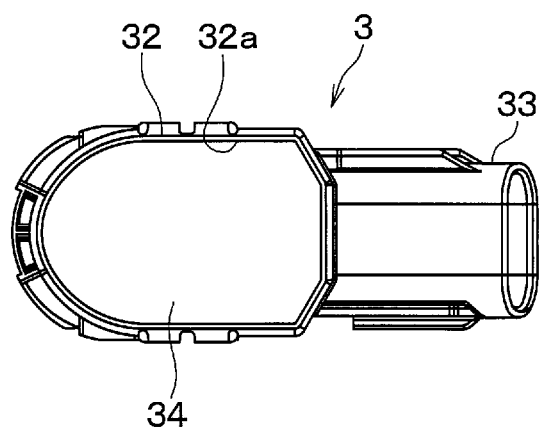
FIG. 2D shows the sensor body in FIG. 2A viewed from a back surface side.
Figure 2E:
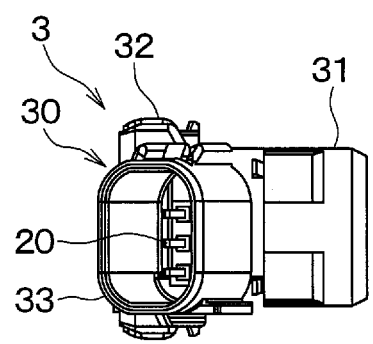
FIG. 2E shows the sensor body in FIG. 2A viewed from a left side.

The case 30 is constituted by a hollow member. The case 30 includes a cylinder portion 31, a housing portion 32 having a substantially elliptical shape, and a connector 33. The cylinder portion 31 is coupled to a hollow portion of the housing portion 32. The ultrasonic vibrator 10 is fixed in the cylinder portion 31, and the lead wires 14 are led to the housing portion 32 side. In the hollow portion of the housing portion 32, a circuit board (not shown) is arranged and the first end of the terminal 20 is led out. The circuit board is electrically connected to the lead wires 14 and also electrically connected to the first end of the terminal 20. As shown in FIG. 2D, one surface of the housing portion 32 is an opening 32a, and a moisture-proof member 34 is provided so that the hollow portion of the housing portion 32 is filled with the moisture-proof member 34 from the opening 32a. Furthermore, the connector 33 is provided at one end of the case 30, and the second end of the terminal 20 is exposed from the connector 33. When an external connector (not shown) is connected to the connector 33, the second end of the terminal 20 exposed from the connector 33 is connected to a terminal of the external connector. Thus, the ultrasonic wave sensor 1 is externally electrically connected.

The bezel 4 is composed of, for example, resin or the like, and is a tubular member having a hollow portion whose center axis extends in one direction. As shown in FIGS. 3A to 3E, the bezel 4 is a substantially cylindrical member. At one end of the bezel 4, a flange 4a is formed and has a larger radial dimension with respect to the center axis than a cylindrical portion 4b constituting a tubular portion of the bezel 4 other than the flange 4a. A surface of the flange 4a on a side opposite to the cylindrical portion 4b is a front surface 4c which is exposed so as to be externally visually recognizable when the ultrasonic wave sensor 1 is attached to the bumper 2. A surface of the flange 4a on the cylindrical portion 4b side is a back surface 4d which is hidden by being directed toward the bumper 2.

At a boundary position between the flange 4a and the cylindrical portion 4b, a groove 4e having an outer diameter smaller than that of the cylindrical portion 4b is formed. The groove 4e is formed so as to surround the bezel 4. The groove 4e may have any width, and for example, the groove 4e has a width not less than a thickness of the vibration prevention member 6 (described later).

The hollow portion of the bezel 4 has a shape and size corresponding to shapes of the ultrasonic vibrator 10 and the cylinder portion 31 of the sensor body 3. The ultrasonic vibrator 10 and the cylinder portion 31 are inserted into the hollow portion. Furthermore, the portion of the bezel 4 other than the flange 4a has an outer diameter smaller than that of the hole 2a formed in the bumper 2, and the flange 4a has an outer diameter larger than that of the hole 2a. Thus, the portion of the bezel 4 other than the flange 4a is inserted into the hole 2a, and the flange 4a is brought into contact with an outer peripheral wall of the hole 2a and is exposed to the outside of the bumper 2.

When the ultrasonic vibrator 10 and the cylinder portion 31 of the sensor body 3 are inserted into the hollow portion of the bezel 4, for example, hooks or the like of the bezel 4 and the sensor body 3 are engaged with each other to prevent the sensor body 3 from detaching from the bezel 4.

Figure 3A:
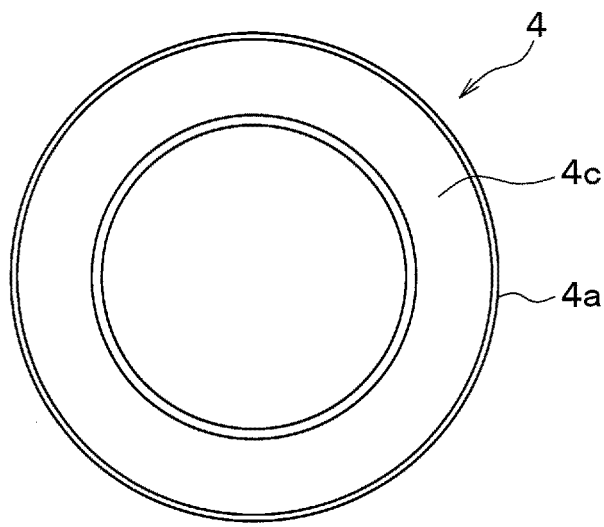
FIG. 3A is a front view of a bezel.
Figure 3B:
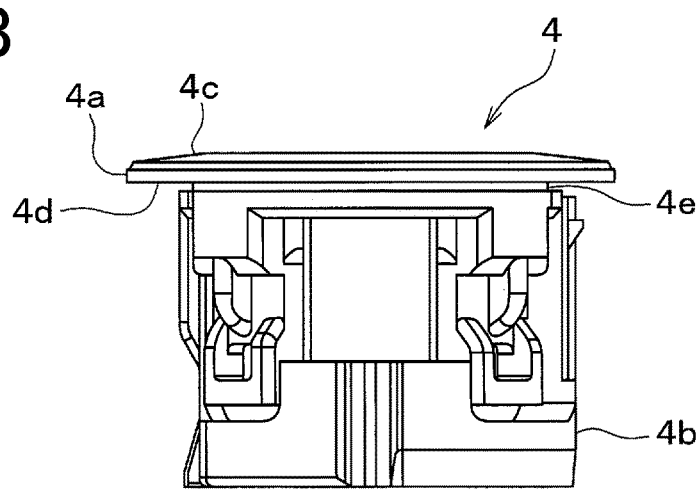
FIG. 3B shows the bezel in FIG. 3A viewed from below.
Figure 3C:
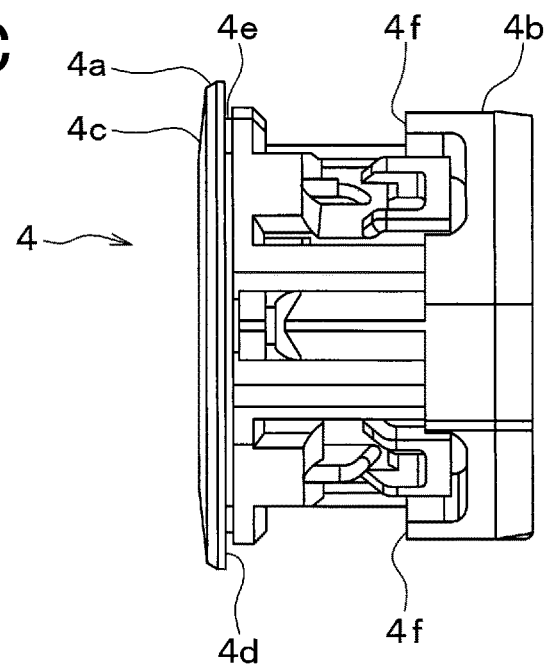
FIG. 3C shows the bezel in FIG. 3A viewed from a right side.
Figure 3D:
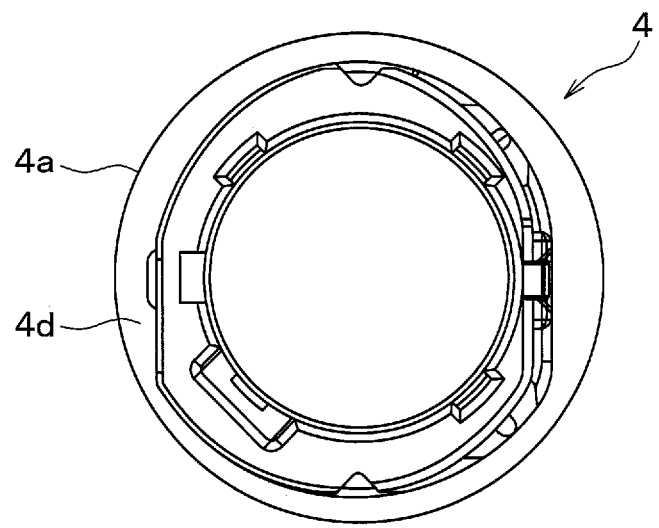
FIG. 3D shows the bezel in FIG. 3A viewed from a back surface side.
Figure 3E:
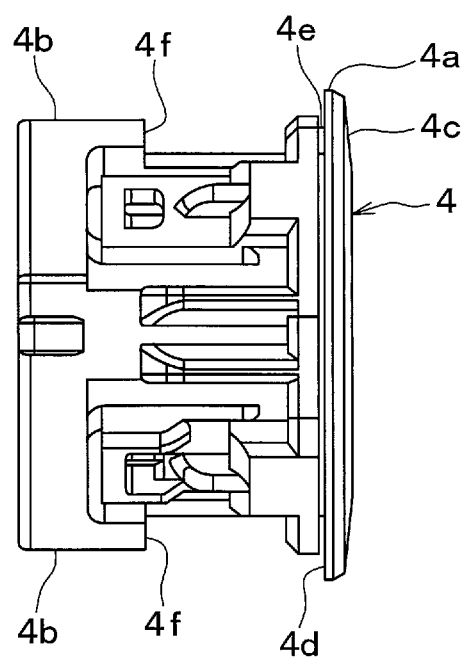
FIG. 3E shows the bezel in FIG. 3A viewed from a left side.
Figure 4A:
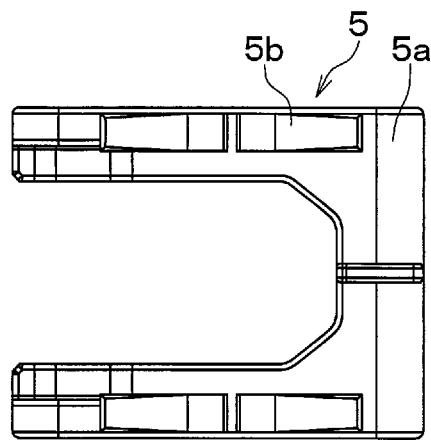
FIG. 4A is a front view of a retainer.
Figure 4B:
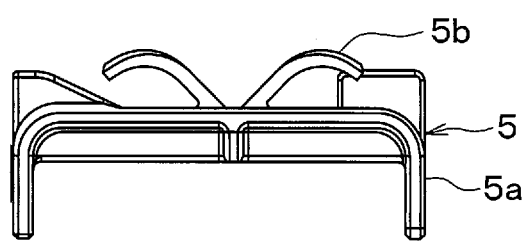
FIG. 4B shows the retainer in FIG. 4A viewed from below.
Figure 4C:
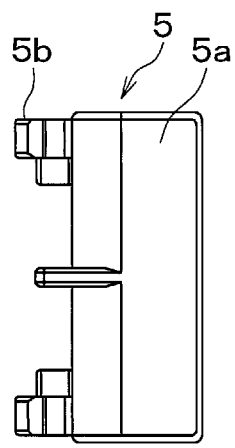
FIG. 4C shows the retainer in FIG. 4A viewed from a right side.
Figure 4D:
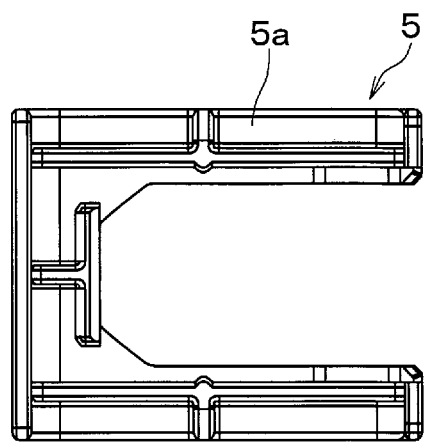
FIG. 4D shows the retainer in FIG. 4A viewed from a back surface side.
Figure 4E:
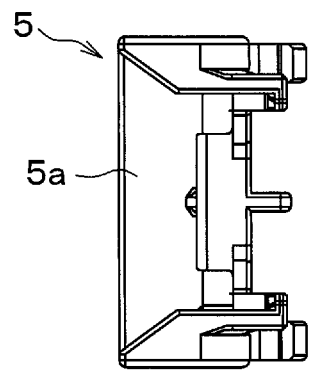
FIG. 4E shows the retainer in FIG. 4A viewed from a left side.

An end of the bezel 4 on a side opposite to the flange 4a has a sliding surface 4f shown in FIG. 3C. The sliding surface 4f is a surface facing a back surface of the bumper 2 and is symmetrically formed on both sides with respect to the hollow portion of the bezel 4. For example, the sliding surface 4f is formed by causing the end of the bezel 4 on the side opposite to the flange 4a so as to be partially protruded or partially recessed. The retainer 5 is slid and fitted between the sliding surface 4f and the back surface of the bumper 2. Thus, the retainer 5 is elastically deformed between the sliding surface 4f and the bumper 2, and due to elastic force of the retainer 5, the flange 4a is pressed against the bumper 2 side so that the bezel 4 and the sensor body 3 are held onto the bumper 2.

The retainer 5 is a member for firmly holding the sensor body 3 and the bezel 4 onto the bumper 2. The present embodiment employs the retainer 5. However, a different member may be used to hold the sensor body 3 and the bezel 4 onto the bumper 2, and thus the retainer 5 is not essential.

In the present embodiment, the retainer 5 is composed of, for example, a resin material or the like, and as shown in FIGS. 4A to 4E, the retainer 5 has a U-shaped portion 5a and an elastic portion 5b.

The U-shaped portion 5a is a U-shaped member having a concave portion in the middle, and the bezel 4 is to be fitted into the concave portion in the middle. A surface inside a U-shape (hereinafter referred to as an inside surface) of linear portions on both sides of the U-shaped portion 5a is brought into contact with an external wall surface of the bezel 4, and a surface of the U-shaped portion 5a on a side opposite to the flange 4a is brought into contact with the sliding surface 4f. Furthermore, the elastic portion 5b is arranged on a surface of the U-shaped portion 5a directed toward the flange 4a.

The elastic portion 5b is provided at each of the linear portions on both sides of the U-shaped portion 5a. The elastic portion 5b is formed by combining two arch-shaped portions in each of which one end is a fixed end supported by the U-shaped portion 5a and the other end is a free end. Before the retainer 5 is fitted between the sliding surface 4f and the back surface of the bumper 2, the elastic portion 5b has a height more than a space between the sliding surface 4f and the back surface of the bumper 2.

By using the retainer 5, the sensor body 3 is fitted into the hole 2a of the bumper 2 together with the bezel 4, and then the retainer 5 is slid and fitted between the sliding surface 4f and the back surface of the bumper 2. Thus, the sensor body 3 and the bezel 4 are firmly held onto the bumper 2. Specifically, when the retainer 5 is fitted between the sliding surface 4f and the back surface of the bumper 2, a bulging portion between the free end and the fixed end of the elastic portion 5b is brought into contact with the back surface of the bumper 2, and thus the elastic portion 5b is elastically deformed. Accordingly, due to elastic reaction force, the U-shaped portion 5a and the elastic portion 5b are pressed against the sliding surface 4f and the back surface of the bumper 2 so that the sensor body 3 and the bezel 4 can be firmly held onto the bumper 2.

In this manner, the sensor body 3 can be fixed to the bumper 2 together with the bezel 4. However, when an obstacle in the vicinity of the vehicle is detected by causing the ultrasonic vibrator 10 to generate ultrasonic waves, vibration of the ultrasonic vibrator 10 is transmitted to the bumper 2 through the case 30 and the bezel 4. In a case where the bumper 2 is composed of a material, such as metal, to which vibration is easily transmitted, reverberation continues for a long time, and this may cause erroneous detection of an obstacle. In the present embodiment, therefore, the vibration prevention member 6 is arranged between the flange 4a and a front surface of the bumper 2.

The vibration prevention member 6 has a function of preventing transmission of vibration of the ultrasonic vibrator 10 to the bumper 2, and is arranged so as to be interposed between the flange 4a and the front surface of the bumper 2. The arrangement of the vibration prevention member 6 between the flange 4a and the front surface of the bumper 2 allows a structure in which a vibrating portion of the sensor body 3 does not directly in contact with the bumper 2.

Figure 7A:
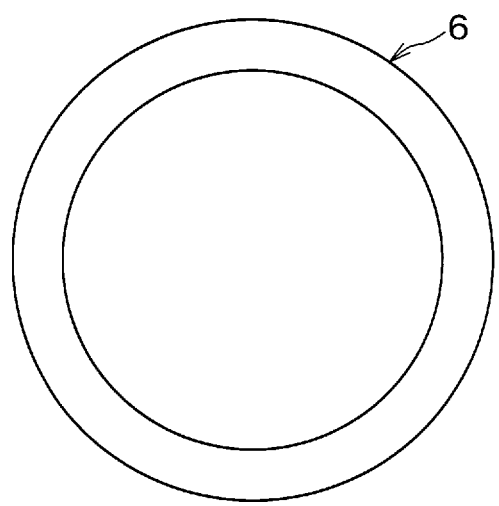
FIG. 7A is a front view of a vibration prevention member.
Figure 7B:
FIG. 7B shows the vibration prevention member in FIG. 7A viewed from below.

In the present embodiment, as shown in FIGS. 7A and 7B, the vibration prevention member 6 has an annular shape surrounding the bezel 4. A radial cross section of the vibration prevention member 6 passing through a center axis of the vibration prevention member 6 has a rectangular shape having right-angled corners. However, the radial cross section of the vibration prevention member 6 may have a rectangular shape having rounded corners, or the like.

For example, the vibration prevention member 6 is constituted by an elastic body composed of an elastic material such as silicone rubber. In the present embodiment, the vibration prevention member 6 has an internal diameter smaller than the outer diameter of the cylindrical portion 4b so that the vibration prevention member 6 is fitted into the groove 4e. Furthermore, the vibration prevention member 6 has an outer diameter smaller than the outer diameter of the flange 4a.

The vibration prevention member 6 only needs to be able to prevent transmission of vibration from the ultrasonic vibrator 10 to the bumper 2, and thus may have any dimension. However, when the dimension of the vibration prevention member 6 is determined considering designability while preventing transmission of vibration, the vibration prevention member 6 preferably has a thickness in the range of 0.2 to 2 mm, and preferably has an outer diameter smaller than the outer diameter of the flange 4a. Of course, even when the vibration prevention member 6 has an outer diameter larger than the outer diameter of the flange 4a, a vibration prevention effect can be obtained. Even such a dimensional relationship can also achieve designability, for example, by configuring the vibration prevention member 6 and the flange 4a so as to have similar figures and be arranged in tiers.

The ultrasonic wave sensor 1 according to the present embodiment is configured as described above so that the ultrasonic wave sensor 1 is firmly held onto the bumper 2. When a connector of a vehicle-mounted cable (not shown) is connected to the connector 33, the ultrasonic wave sensor 1 is electrically connected, through the terminal 20, to a control device or the like provided outside the ultrasonic wave sensor 1. When ultrasonic waves are outputted from the ultrasonic vibrator 10 on the basis of a piezoelectric effect due to voltage application from the control device and reflected waves from an obstacle or the like are received, the ultrasonic vibrator 10 is vibrated, and thus a voltage based on the piezoelectric effect is generated as a detection output. The detection output is amplified by an amplification circuit or the like, and an output waveform obtained after the amplification is compared with a threshold voltage to detect reflected waves. Then, a distance to the obstacle is detected on the basis of a time between an output timing of the ultrasonic waves and a reception timing of the reflected waves.

In a case where the bumper 2 is composed of a material such as metal, vibration of the ultrasonic vibrator 10 is easily transmitted to the bumper 2. However, as in the present embodiment, when the ultrasonic wave sensor 1 includes the vibration prevention member 6, it is possible to prevent transmission of vibration to the bumper 2. Accordingly, reverberation after ultrasonic waves are outputted from the ultrasonic vibrator 10 is attenuated in a short time. This makes it possible to prevent the ultrasonic wave sensor 1 from erroneously detecting, due to presence of reverberation, that reflected waves are received. Thus, the ultrasonic wave sensor 1 capable of preventing erroneous detection can be achieved.

Figure 8A:
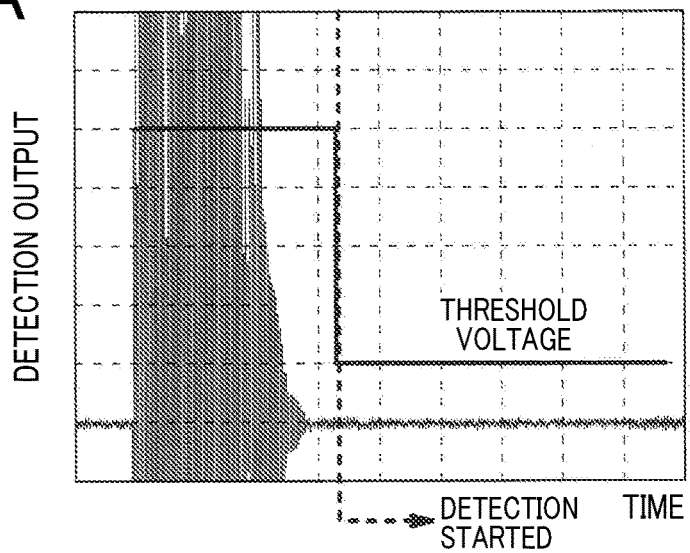
FIG. 8A is a view showing a result obtained by examining a change in detection output of the ultrasonic wave sensor alone not attached to the bumper.
Figure 8B:
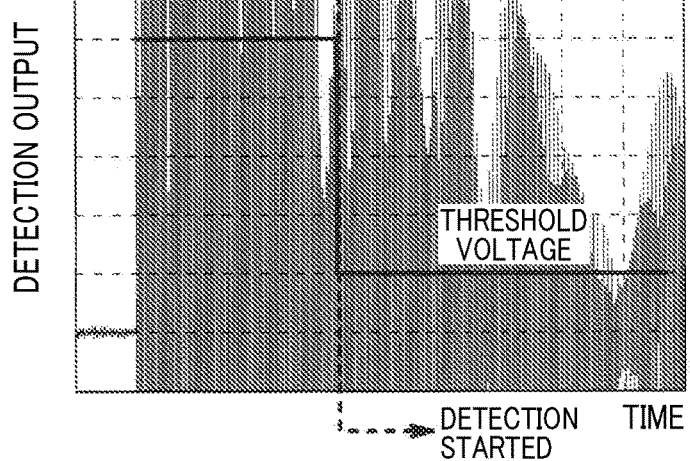
FIG. 8B is a view showing a result obtained by examining a change in detection output of the ultrasonic wave sensor not including any vibration prevention member.
Figure 8C:
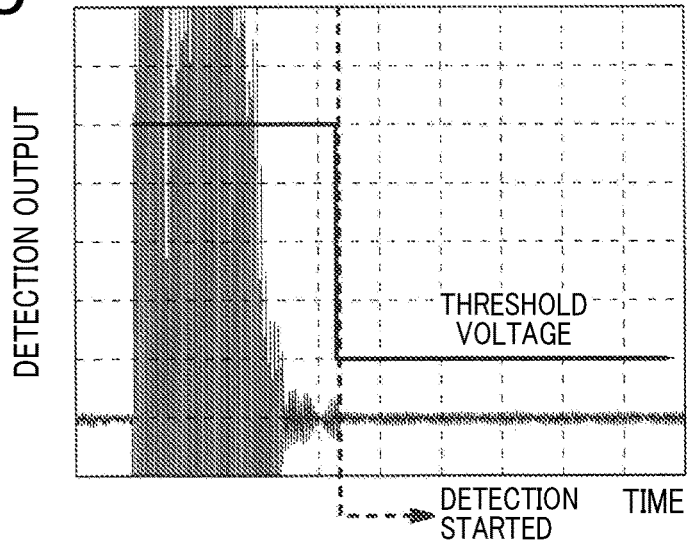
FIG. 8C is a view showing a result obtained by examining a change in detection output of the ultrasonic wave sensor including the vibration prevention member.

For reference purposes, a change in detection output was measured by experiment in each of the ultrasonic wave sensor 1 alone not attached to the bumper 2, a structure of the present embodiment in which the vibration prevention member 6 was arranged between the flange 4a and the bumper 2, and a conventional structure in which no vibration prevention member 6 was arranged. FIGS. 8A to 8C show results obtained by amplifying the detection outputs. As shown in the results, as compared with the ultrasonic wave sensor 1 alone shown in FIG. 8A, in the conventional structure shown in FIG. 8B, reverberation was present until a timing at which it was assumed that the reflected waves arrive, and the reverberation was erroneously detected as reflected waves. On the other hand, in the structure of the present embodiment shown in FIG. 8C, reverberation is almost eliminated by a timing at which it is assumed that the reflected waves arrive, and erroneous detection of the reverberation as reflected waves is able to be prevented. This experiment also shows that the above-mentioned effect can be obtained.

Second Embodiment

A second embodiment will be described. The present embodiment is obtained by modifying the structure of the vibration prevention member 6 of the first embodiment, and the other configuration of the present embodiment is similar to that of the first embodiment. Accordingly, only differences from the first embodiment will be described.

Figure 9A:
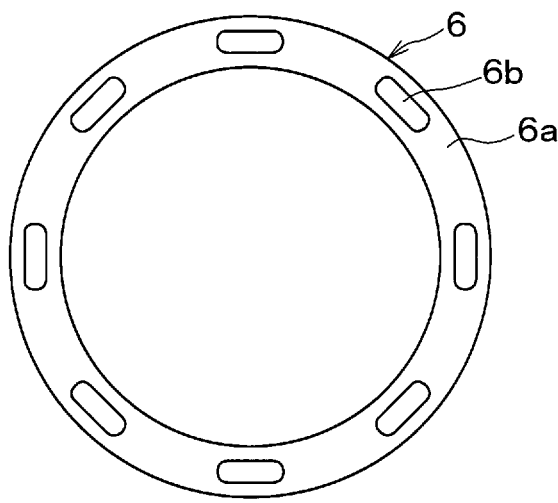
FIG. 9A is a front view of a vibration prevention member included in an ultrasonic wave sensor described in a second embodiment.
Figure 9B:
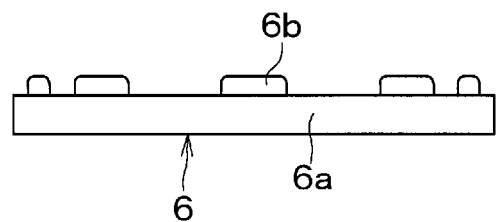
FIG. 9B shows the vibration prevention member in FIG. 9A viewed from below.

The present embodiment employs the vibration prevention member 6 having a shape shown in FIGS. 9A and 9B. In addition to an annular portion 6a having a similar shape to the vibration prevention member 6 of the first embodiment, the vibration prevention member 6 of the present embodiment has a protrusion 6b formed on one end face of the annular portion 6a. The vibration prevention member 6 has a plurality of protrusion 6b which are arranged at regular intervals in a circumferential direction around a center axis of the annular portion 6a. In the example shown in FIGS. 9A and 9B, the vibration prevention member 6 has a structure including eight protrusions 6b. The protrusions 6b each have a substantially elliptical shape when viewed from a center axis direction of the annular portion 6a, and have a width smaller than a radial dimension of the annular portion 6a.

The vibration prevention member 6 having such a structure is arranged between the flange 4a and the bumper 2. The vibration prevention member 6 may be directed in any direction. The vibration prevention member 6 may be arranged so that the protrusions 6b are directed toward the flange 4a or toward the bumper 2.

In this manner, even when the vibration prevention member 6 has a structure including the annular portion 6a and the protrusions 6b, it is possible to prevent vibration from being transmitted to the bumper 2 when ultrasonic waves are outputted from the ultrasonic vibrator 10. Thus, an effect similar to that of the first embodiment can be obtained.

Figure 10A:
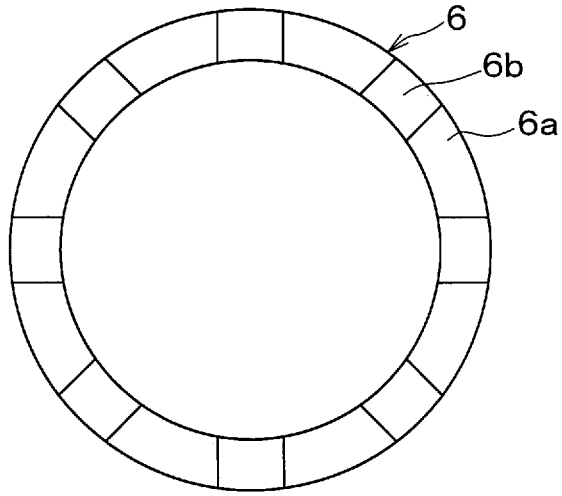
FIG. 10A is a front view of a vibration prevention member described in a modified example of the second embodiment.
Figure 10B:
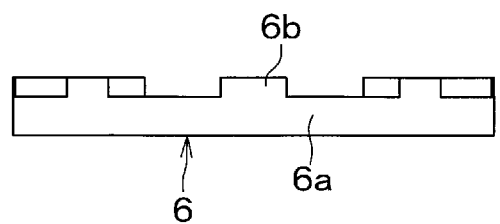
FIG. 10B is the vibration prevention member in FIG. 10A viewed from below.

In the present embodiment, as shown in FIGS. 9A and 9B, the protrusions 6b have an elliptical shape when viewed from the center axis direction of the annular portion 6a, and have a width smaller than the radial dimension of the annular portion 6a. However, this is merely an example, and the shapes and dimensions of the components constituting the vibration prevention member 6 may be modified as appropriate. For example, as shown in FIGS. 10A and 10B, the protrusions 6b may be provided so as to extend from the center axis of the annular portion 6a in a radial direction and reach from an inner edge to an outer edge of the annular portion 6a.

Third Embodiment

A third embodiment will be described. The present embodiment is also obtained by modifying the structure of the vibration prevention member 6 of the first embodiment, and the other configuration of the present embodiment is similar to that of the first embodiment. Accordingly, only differences from the first embodiment will be described.

Figure 11A:
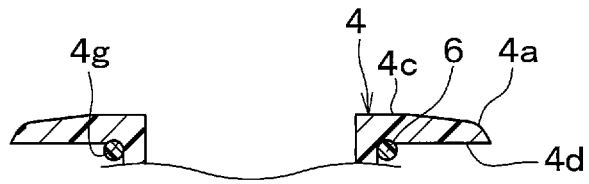
FIG. 11A is a cross-sectional view of a portion of a bezel, which is included in an ultrasonic wave sensor, in the vicinity of a flange described in a third embodiment.
Figure 11B:
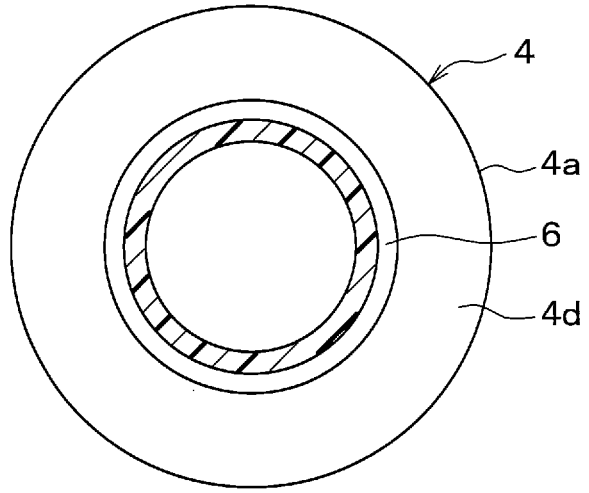
FIG. 11B shows the portion of the bezel in FIG. 11A viewed from below.

As shown in FIGS. 11A and 11B, the present embodiment employs an O-ring as the vibration prevention member 6. Furthermore, a ring-shaped groove 4g having a shape corresponding to the shape of the vibration prevention member 6 is formed on the back surface 4d of the flange 4a, i.e., the surface of the flange 4a on the cylindrical portion 4b side so that a part of the vibration prevention member 6 is inserted into the ring-shaped groove 4g.

In the example shown in FIGS. 11A and 11B, the vibration prevention member 6 has an internal diameter corresponding to the outer diameter of the cylindrical portion 4b so that the vibration prevention member 6 is brought into contact with the cylindrical portion 4b. Accordingly, alignment for aligning a center position of the vibration prevention member 6 with a center axis of the flange 4a is necessarily performed. However, the vibration prevention member 6 does not necessarily need to be brought into contact with the cylindrical portion 4b. Even in such a case, by forming the ring-shaped groove 4g so that a part of the vibration prevention member 6 is fitted into the ring-shaped groove 4g, the center position of the vibration prevention member 6 can easily be aligned with the center axis of the flange 4a. Furthermore, by forming the ring-shaped groove 4g so that a part of the vibration prevention member 6 is inserted into the ring-shaped groove 4g, a gap between the flange 4a and the bumper 2 can be reduced, and this can prevent deterioration in designability.

Fourth Embodiment

A fourth embodiment will be described. The present embodiment differs from the first embodiment in that a structure different from the vibration prevention member 6 prevents transmission of vibration from the ultrasonic vibrator 10 to the bumper 2, and the other configuration of the present embodiment is similar to that of the first embodiment. Accordingly, only differences from the first embodiment will be described.

Figure 12A:
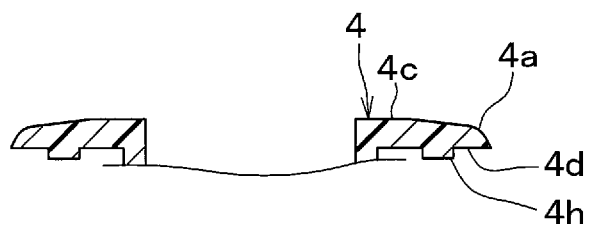
FIG. 12A is a cross-sectional view of a portion of a bezel, which is included in an ultrasonic wave sensor, in the vicinity of a flange described in a fourth embodiment.
Figure 12B:
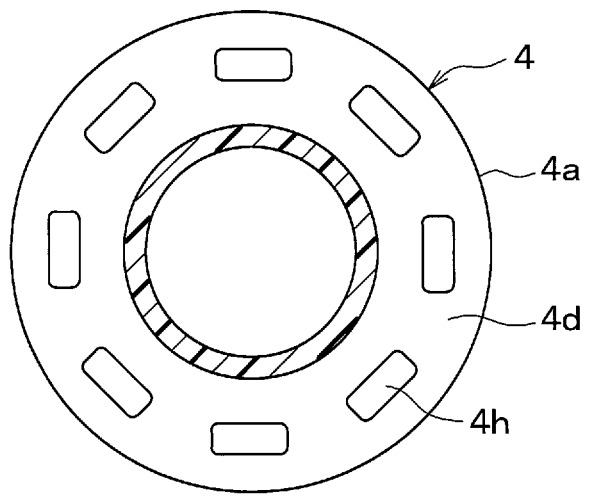
FIG. 12B shows the portion of the bezel in FIG. 12A viewed from below.

In the present embodiment, transmission of vibration from the ultrasonic vibrator 10 to the bumper 2 is prevented by modifying the structure of the flange 4a of the bezel 4. As shown in FIGS. 12A and 12B, a protrusion 4h is provided on the back surface 4d side of the flange 4a, i.e., the surface of the flange 4a on the cylindrical portion 4b side, and the protrusion 4h is in contact with the bumper 2. In the present embodiment, a plurality of protrusions 4h are provided, and the protrusions 4h are arranged at regular intervals in a circumferential direction around the center axis of the flange 4a. The example in FIGS. 12A and 12B shows a structure including eight protrusions 4h. The protrusions 4h each have a rectangular shape having rounded four corners when viewed from the center axis direction of the flange 4a, and have a width smaller than a radial dimension of the back surface 4d of the flange 4a.

The protrusions 4h having such a configuration can reduce a contact area between the flange 4a and the bumper 2 as compared with when an entire region of the back surface 4d or an entire circumference of an outer edge portion of the back surface 4d of the flange 4a is in contact with the bumper 2.

In this manner, by providing the protrusions 4h on the back surface of the flange 4a to reduce the contact area between the flange 4a and the bumper 2, it is possible to prevent vibration from being transmitted to the bumper 2 when ultrasonic waves are outputted from the ultrasonic vibrator 10. Thus, an effect similar to that of the first embodiment can be obtained.

Figure 13A:
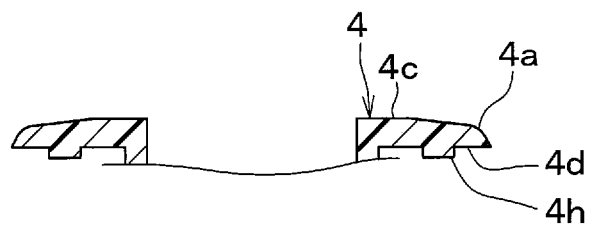
FIG. 13A is a cross-sectional view of a portion of a bezel in the vicinity of a flange described in a modified example of the fourth embodiment.
Figure 13B:
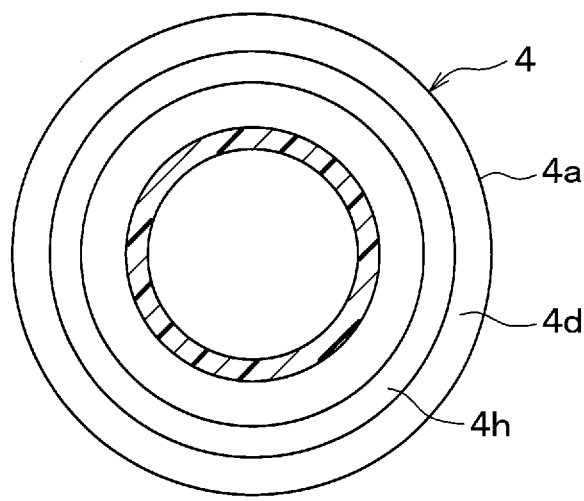
FIG. 13B shows the portion of the bezel in FIG. 13A viewed from below.

As shown in FIGS. 12A and 12B, the present embodiment employs the structure including the plurality of protrusions 4h. However, as shown in FIGS. 13A and 13B, the protrusion 4h may have an annular shape surrounding the center axis of the flange 4a. Even in such a case, by causing a width, i.e., a radial dimension, of the protrusion 4h to be smaller than the radial dimension of the back surface 4d, the contact area between the flange 4a and the bumper 2 can be reduced, and thus the above-mentioned effect can be obtained. Furthermore, instead of a flat surface, the back surface 4d of the flange 4a may have a shape in which an outer edge portion of the flange 4a protrudes toward the bumper 2 and an inner edge portion of the flange 4a is recessed. In this case, an entire circumference of the outer edge portion of the flange 4a is in contact with the bumper 2. As shown in FIGS. 13A and 13B, however, when the protrusion 4h having an annular shape is provided on an inner side of the outer edge portion of the flange 4a, the contact area can be reduced as compared with when the entire circumference of the outer edge portion of the flange 4a is in contact with the bumper 2.

Of course, in both the cases where the plurality of protrusions 4h are provided as shown in FIGS. 12A and 12B and the protrusion 4h having an annular shape is provided on the back surface of the flange 4a as shown in FIGS. 13A and 13B, the protrusion 4h may be provided along the outer edge portion of the flange 4a. In this case, the contact area between the flange 4a and the bumper 2 is increased as compared with when the protrusion 4h is provided on the inner side of the outer edge portion of the flange 4a, but the contact area can be reduced as compared with when the front of the back surface of the flange 4a is in contact with the bumper 2.

Fifth Embodiment

A fifth embodiment will be described. The present embodiment is obtained by modifying the shape of the retainer 5 of the first to fourth embodiments, and other configurations of the present embodiment are similar to those of the first to fourth embodiments. Accordingly, only differences from the first to fourth embodiments will be described.

Figure 14A:
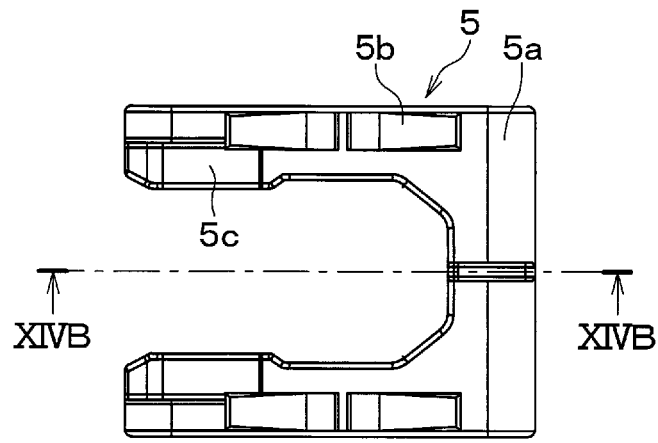
FIG. 14A is a front view of a retainer included in an ultrasonic wave sensor described in a fifth embodiment.
Figure 14B:
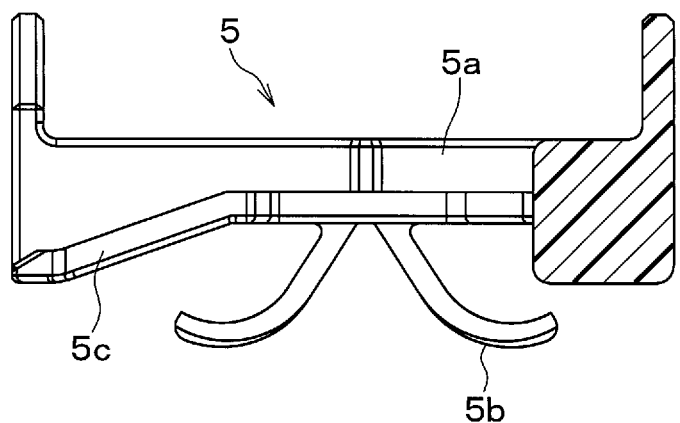
FIG. 14B is a cross-sectional view taken along line XIVB-XIVB indicated by arrows in FIG. 14A.
Figure 14C:
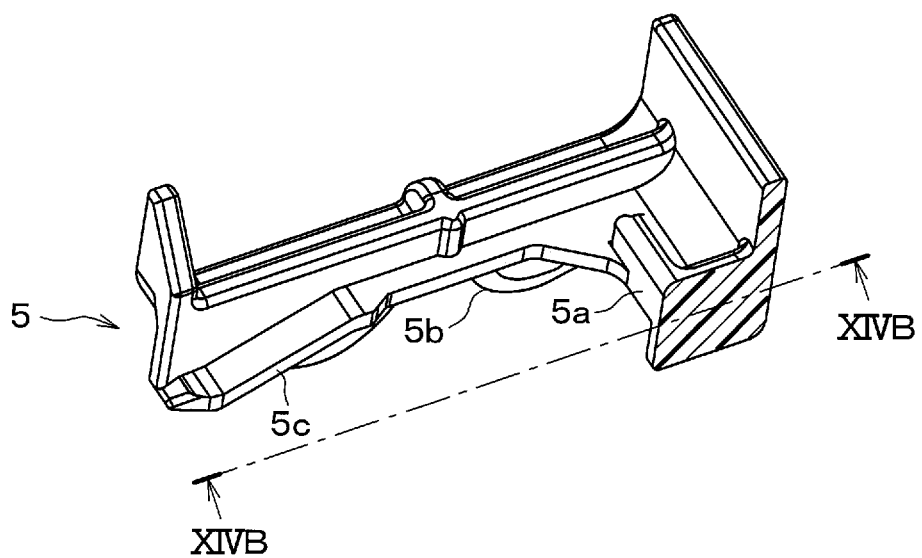
FIG. 14C is a perspective view of the retainer cut along the XIVB-XIVB cross section in FIG. 14A.

As shown in FIGS. 14A, 14B, and 14C, in the present embodiment, an inclined guide 5c is provided on an internal wall surface of the retainer 5, i.e., the inside surface of the U-shaped portion 5a.

The inclined guide 5c is inclined in a direction from an opening inlet side toward a bottom side of the U-shaped portion 5a. Specifically, as shown in FIG. 14B, the inclined guide 5c is inclined so that a portion of the inclined guide 5c on the opening inlet side of the U-shaped portion 5a is located on a tip side of the elastic portion 5b and a portion of the inclined guide 5c closer to the bottom side of the U-shaped portion 5a is located closer to a base side of the elastic portion 5b. The inclined guide 5c is provided on each of the both inside surfaces of the U-shaped portion 5a. The inclined guide 5c has a structure in which the portion of the inclined guide 5c on the opening inlet side of the U-shaped portion 5a is more protruding inward than the portion of the inclined guide 5c on the bottom side of the U-shaped portion 5a.

Similarly to the first embodiment, also in the present embodiment, the retainer 5 is slid and fitted between the sliding surface 4f of the bezel 4 and the back surface of the bumper 2. When attempting to perform the fitting of the retainer 5, at first, the elastic portion 5b is not yet elastically deformed. Accordingly, if the retainer 5 has a structure without the inclined guide 5c, a level difference is generated between the sliding surface 4f and the surface of the U-shaped portion 5a to be brought into contact with the sliding surface 4f. Thus, when the retainer 5 is fitted between the sliding surface 4f and the back surface of the bumper 2, in order to reduce the level difference, the retainer 5 needs to be fitted while the elastic portion 5b is being elastically deformed.

On the other hand, in the case of the retainer 5 including the inclined guide 5c as in the present embodiment, when the retainer 5 is fitted between the sliding surface 4f and the back surface of the bumper 2, it is possible to reduce a level difference between the sliding surface 4f and the portion of the inclined guide 5c on the opening inlet side of the U-shaped portion 5a. Accordingly, when the retainer 5 is fitted between the sliding surface 4f and the back surface of the bumper 2, the elastic portion 5b does not need to be elastically deformed, or the elastic deformation amount can be reduced.

This can improve workability when the retainer 5 is fitted between the sliding surface 4f and the back surface of the bumper 2.

The inclined guide 5c does not necessarily need to protrude inward from the inside surface of the U-shaped portion 5a. However, the inclined guide 5c having such a structure makes it possible to prevent the retainer 5 from detaching after the retainer 5 is fitted. In the structure in which the inclined guide 5c protrudes inward from the inside surface of the U-shaped portion 5a, a dimension between both the inclined guides 5c is smaller than a dimension of the bezel 4. In such a case, when the retainer 5 is fitted, it is only necessary to elastically deform the retainer 5 so that the opening inlet of the U-shaped portion 5a is widened.

Other Embodiments

The present disclosure has been described on the basis of the above embodiments, but the present disclosure is not limited to the embodiments and also includes various modified examples and modifications within an equivalent range. In addition, the scope or range of thought of the present disclosure includes various combinations or forms and other combinations or forms including only one element, one or more elements, or one or less elements of those.

For example, in the second embodiment, the vibration prevention member 6 has a structure including the protrusions 6b, but instead of the plurality of protrusions 6b, the vibration prevention member 6 may have a structure in which the annular portion 6a has a plurality of holes.

In the fourth embodiment, the protrusions 4h are formed as an concave-convex portion for reducing the contact area between the flange 4a and the bumper 2 as compared when the entire region of the back surface 4d of the flange 4a is in contact with the bumper 2, but the concave-convex portion is not limited to the protrusions 4h. For example, the concave-convex portion may be a concave portion or a groove at which the back surface 4d is partially recessed.

The above embodiments have described the case where the ultrasonic wave sensor 1 is attached to the bumper 2. However, the ultrasonic wave sensor 1 of the above embodiments is applicable to a case where the ultrasonic wave sensor 1 is attached to vehicle components including the bumper 2.

An ultrasonic wave sensor of an aspect of the present disclosure includes: a bezel (4) that is configured by a tubular member having a hollow portion whose center axis extends in one direction, and includes a tubular portion (4b) and a flange (4a) at one end of the tubular portion, the flange having a larger radial dimension with respect to the center axis than the tubular portion, one surface of the flange on a side opposite to the tubular portion being a front surface (4c), one surface of the flange on the tubular portion side being a back surface (4d); a sensor body (3) that includes an ultrasonic vibrator (10) and is integrated with the bezel in a state where a part of the sensor body including the ultrasonic vibrator is inserted into the hollow portion of the bezel; and a vibration prevention member (6) that is arranged on the back surface of the flange and is configured by an elastic body to prevent transmission of vibration of the ultrasonic vibrator. The vibration prevention member is an O-ring having an annular shape surrounding the bezel so as to surround the center axis of the bezel, and the back surface of the flange has a ring-shaped groove (4g) into which at least a part of the O-ring is inserted.

When the ultrasonic wave sensor having the above configuration is attached to a vehicle component such as a bumper, if the vehicle component is composed of a material, such as metal, to which vibration is easily transmitted, vibration of the ultrasonic vibrator is easily transmitted to the vehicle component. However, when the ultrasonic wave sensor is provided with the vibration prevention member on the back surface of the flange of the bezel, it is possible to prevent transmission of vibration to the vehicle component. Accordingly, reverberation after ultrasonic waves are outputted from the ultrasonic vibrator is attenuated in a short time. This makes it possible to prevent the ultrasonic wave sensor from erroneously detecting, due to presence of reverberation, that reflected waves are received. Thus, an ultrasonic wave sensor capable of preventing erroneous detection can be achieved.

What is claimed is:

1. An ultrasonic wave sensor comprising:
a bezel that is configured by a tubular member having a hollow portion whose center axis extends in one direction, and includes a tubular portion and a flange at one end of the bezel, the flange having a larger radial dimension with respect to the center axis than the tubular portion, one surface of the flange on a side opposite to the tubular portion being a front surface, one surface of the flange on the tubular portion side being a back surface;
a sensor body that includes an ultrasonic vibrator and is integrated with the bezel in a state where a part of the sensor body including the ultrasonic vibrator is inserted into the hollow portion of the bezel; and
a vibration prevention member that is in contact with the back surface of the flange and is configured by an elastic body to prevent transmission of vibration of the ultrasonic vibrator, wherein
the vibration prevention member is an O-ring having an annular shape surrounding the bezel so as to surround the center axis of the bezel, and
the back surface of the flange has a ring-shaped groove into which at least a part of the O-ring is inserted.

2. The ultrasonic wave sensor according to claim 1, wherein
the tubular portion of the bezel is inserted into a hole formed in a vehicle component and is fixed to the vehicle component so that the back surface of the flange is directed toward the vehicle component, and
the vibration prevention member is arranged between the flange and the vehicle component.

3. The ultrasonic wave sensor according to claim 2, wherein the ultrasonic wave sensor is attached to a metal bumper as the vehicle component.

4. An ultrasonic wave sensor comprising:
a bezel that is configured by a tubular member having a hollow portion whose center axis extends in one direction, and includes a tubular portion and a flange at one end of the bezel, the flange having a larger radial dimension with respect to the center axis than the tubular portion, one surface of the flange on a side opposite to the tubular portion being a front surface, one surface of the flange on the tubular portion side being a back surface; and
a sensor body that includes an ultrasonic vibrator and is integrated with the bezel in a state where a part of the sensor body including the ultrasonic vibrator is inserted into the hollow portion of the bezel, wherein
the tubular portion of the bezel is inserted into a hole formed in a vehicle component and is fixed to the vehicle component so that the back surface of the flange is directed toward the vehicle component,
the back surface of the flange has a concave-convex portion that reduces a contact area between the flange and the vehicle component as compared with an entire region of the back surface being in contact with the vehicle component, and
the concave-convex portion is a protrusion protruding from the back surface of the flange and has an annular shape surrounding the center axis of the flange.

5. The ultrasonic wave sensor according to claim 4, wherein the ultrasonic wave sensor is attached to a metal bumper as the vehicle component.

* * * * *